United States Patent
Bai et al.

(10) Patent No.: US 11,381,355 B2
(45) Date of Patent: Jul. 5, 2022

(54) INFORMATION DETERMINATION METHOD, APPARATUS AND DEVICE

(71) Applicant: DATANG MOBILE COMMUNICATIONS EQUIPMENT CO., LTD., Beijing (CN)

(72) Inventors: Wei Bai, Beijing (CN); Xuejuan Gao, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/290,653

(22) PCT Filed: Aug. 14, 2019

(86) PCT No.: PCT/CN2019/100585
§ 371 (c)(1),
(2) Date: Apr. 30, 2021

(87) PCT Pub. No.: WO2020/088034
PCT Pub. Date: May 7, 2020

(65) Prior Publication Data
US 2021/0359797 A1 Nov. 18, 2021

(30) Foreign Application Priority Data
Nov. 2, 2018 (CN) .......................... 201811302296.7

(51) Int. Cl.
*H04L 1/18* (2006.01)
*H04W 72/12* (2009.01)

(52) U.S. Cl.
CPC .......... *H04L 1/1887* (2013.01); *H04L 1/1812* (2013.01); *H04W 72/1268* (2013.01)

(58) Field of Classification Search
CPC ... H04W 28/04; H04W 72/04; H04W 72/042; H04W 88/08; H04W 72/1268; H04L 5/0007; H04L 1/1812; H04L 1/1887
(Continued)

(56) References Cited

U.S. PATENT DOCUMENTS

2018/0049229 A1  2/2018  Dinan et al.
2018/0092122 A1  3/2018  Babei et al.
(Continued)

FOREIGN PATENT DOCUMENTS

CN  102394728 A  3/2012
CN  108400845 A  8/2018
(Continued)

OTHER PUBLICATIONS

3GPP TSG RAN WG1 Meeting #94bis, Chengdu, China, Oct. 8-12, 2018, R1-1810397, Source: vivo, Title: Enhanced UL grant-free transmission for URLLC, Agenda item: 7.2.6.3. (Year: 2018).*
(Continued)

*Primary Examiner* — Pankaj Kumar
*Assistant Examiner* — Sanjay K Dewan
(74) *Attorney, Agent, or Firm* — Ladas & Parry, LLP

(57) ABSTRACT

An information determination method, an information determination apparatus, and a device are provided. The information determination method includes: for multiple configurations of uplink grant-free transmission, detecting uplink transmission on a resource corresponding to at least one of the multiple configurations; and in a case that a first configuration corresponding to a resource where the uplink transmission is detected is not a predetermined configuration, determining an HARQ ID of the detected uplink transmission according to association information between the first configuration and the predetermined configuration.

16 Claims, 7 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0176945 A1 | 6/2018 | Cao et al. | |
| 2019/0021017 A1* | 1/2019 | Nagaraja | H04W 72/042 |
| 2019/0053319 A1* | 2/2019 | Jeon | H04L 5/0098 |
| 2019/0230689 A1* | 7/2019 | Cao | H04L 1/0068 |
| 2019/0230691 A1 | 7/2019 | Cao et al. | |
| 2020/0322981 A1* | 10/2020 | Choe | H04W 74/0833 |
| 2021/0007135 A1* | 1/2021 | Sun | H04W 74/08 |
| 2021/0051672 A1* | 2/2021 | Rastegardoost | H04W 72/0446 |

FOREIGN PATENT DOCUMENTS

| | | | | |
|---|---|---|---|---|
| WO | WO 2017/136265 A1 | 8/2017 | | |
| WO | WO 2017136265 A1 * | 8/2017 | ............... | H04L 1/18 |
| WO | WO 2018/049229 A1 * | 3/2018 | ............. | A01K 29/00 |
| WO | WO 2020/088034 A1 * | 5/2020 | ........ | H04W 72/0413 |

OTHER PUBLICATIONS

3GPP TSG RAN WG1 Meeting 91, Reno, USA, Nov. 27-Dec. 1, 2017, R1-1719516, Source: ZTE, Sanechips, Title: Remaining details of UL transmission without grant, Agenda item: 7.3.3.4. (Year: 2017).*

3GPP TSG RAN WG1 Meeting #94bis, Chengdu, China, Oct. 8-12, 2018, R1-1810553, Source: CATT, Title: On enhancements to configured UL grant operation, Agenda item: 7.2.6.4. (Year: 2018).*

International Search Report and Written Opinion issued for International Application No. PCT/CN2019/100585 dated Oct. 29, 2019.

International Preliminary Report on Patentability issued for International Application No. PCT/CN2019/100585 dated Apr. 27, 2021.

Vivo, "Enhanced UL grant-free transmission for URLLC," 3GPP TSG RAN WG1 Meeting #94bis, R1-1810397, Oct. 8-12, 2018, entire document.

ZTE, Sanechips, "Remaining details of UL transmission without grant," 3GPP TSG RAN WG1 Meeting 91, R1-1719516, Nov. 27-Dec. 1, 2017, entire document.

CATT, "On enhancements to configured UL grant operation," 3GPP TSG RAN WG1 Meeting #94bis, R1-1810553, Oct. 8-12, 2018, entire document.

Huawei, HiSilicon, "UL data transmission procedure with and without UL grant", R1-1717091, 3GPP TSG RAN WGI Meeting #90bis, Prague, Czech Republic, Oct. 9-13, 2017, all pages.

First Office Action and Search Report from CN app. No. 201811302296. 7, dated Nov. 12, 2021, with English translation from Global Dossier, all pages.

Extended European Search Report from EP app. No. 19879395.2, dated Nov. 29, 2021, all pages.

* cited by examiner

INFORMATION DETERMINATION METHOD, APPARATUS AND DEVICE

CROSS-REFERENCE TO RELATED APPLICATIONS

The present application is the U.S. National Stage of PCT/CN2019/100585 filed on Aug. 14, 2019, which claims priority to Chinese patent application no. 201811302296.7 filed in China on Nov. 2, 2018, the disclosures of which are incorporated in their entirety by reference herein.

TECHNICAL FIELD

Embodiments of the present disclosure relate to the field of communication technologies, in particular to an information determination method, an information determination apparatus, and a device.

BACKGROUND

With the development and evolvement of requirements of mobile communication services, multiple organizations such as the $3^{rd}$ Generation Partnership Project (3GPP) begin to research a new radio communication system (i.e., the 5th generation new radio access technology (5 Generation New RAT or 5G NR)) as the future mobile communication system. In the 5G NR system, low latency and high reliability communication is one of the important requirements. Consequently, transmission schemes such as ultra reliable and low latency communication (Ultra Reliable & Low Latency Communication, URLLC) emerge. It is relatively easy to meet the low latency requirement alone or to meet the high reliability requirement alone. However, it is difficult to meet the low latency requirement and the high reliability requirement simultaneously, which are usually met with the price of high complexity.

For URLLC services, an uplink grant-free scheme will be supported in NR standards to reduce air interface transmission latency, meanwhile a repeated transmission scheme will be supported to increase reliability.

The arrival of user data at the user equipment (User Equipment, UE) side is random. However, in a conventional uplink grant-free repeated transmission scheme, a configured period is defined, and it is required that, after transmission of the UE starts in a period, the transmission of the UE needs to finish in the period and may not extend beyond the period. Consequently, the quantity of actual repetitions may be less than the configured quantity of repetitions, which impacts the reliability. To improve the reliability, multiple parallel configurations are introduced, where there are offsets in terms of start position of period among these configurations.

In the uplink grant-free repeated transmission scheme, when multiple configurations are adopted, the problem of how to determine the hybrid automatic repeat request (HARQ) identification (ID) of each configuration needs to be solved. In the HARQ ID configuration method in the related technologies, when multiple configurations exist simultaneously, a large latency may be caused due to the influence of maximum quantity of HARQ processes.

SUMMARY

In view of the above, embodiments of the present disclosure provide an information determination method, an information determination apparatus, and a device, to solve the problem of large latency caused when multiple configurations exist simultaneously in an uplink grant-free repeated transmission scheme.

To solve the above technical problem, in a first aspect, embodiments of the present disclosure provide an information determination method. The method is applied to a network side device and includes: for multiple configurations of uplink grant-free transmission, detecting uplink transmission on a resource corresponding to at least one of the multiple configurations; and in a case that a first configuration corresponding to a resource where the uplink transmission is detected is not a predetermined configuration, determining a hybrid automatic repeat request (HARQ) identification (ID) of the detected uplink transmission, according to association information between the first configuration and the predetermined configuration.

The determining the HARQ ID of the detected uplink transmission according to the association information between the first configuration and the predetermined configuration includes: determining a time domain position of a first transmission opportunity (TO) in the first configuration; determining, in the predetermined configuration, a target period associated with the time domain position of the first TO; and determining the HARQ ID of the detected uplink transmission according to attribute information of the target period.

The determining, in the predetermined configuration, the target period associated with the time domain position of the first TO includes: determining, according to the time domain position of the first TO, a period in the predetermined configuration that overlaps in a time domain with the time domain position of the first TO as the target period.

The determining, in the predetermined configuration, the target period associated with the time domain position of the first TO includes: selecting a first period in the predetermined configuration; and determining the first period as the target period, in a case that an offset between the time domain position of the first TO in the first configuration and a time domain position of a first TO in the first period is less than a time domain length of the first period.

The determining the HARQ ID of the detected uplink transmission according to attribute information of the target period includes: acquiring a sequence number, of a first orthogonal frequency division multiplexing (OFDM) symbol of the first TO in the target period, in system frames, the quantity of OFDM symbols in the target period, and the total quantity of HARQ processes; and determining the HARQ ID according to the sequence number, the quantity of OFDM symbols and the total quantity of HARQ processes.

Before the detecting the uplink transmission on the resource corresponding to the at least one of the multiple configurations, the method further includes: configuring the multiple configurations of uplink grant-free transmission and determining the predetermined configuration among the multiple configurations; and transmitting indication information to a terminal, where the indication information includes information about the predetermined configuration.

In a second aspect, embodiments of the present disclosure provide an information determination method. The method is applied to a terminal and includes: determining a first configuration corresponding to a resource of uplink transmission; and in a case that the first configuration is not a predetermined configuration, determining a hybrid automatic repeat request (HARQ) identification (ID) of the uplink transmission, according to association information between the first configuration and the predetermined configuration.

The determining the HARQ ID of the uplink transmission according to the association information between the first configuration and the predetermined configuration includes: determining a time domain position of a first transmission opportunity (TO) in the first configuration; determining, in the predetermined configuration, a target period associated with the time domain position of the first TO; and determining the HARQ ID of the uplink transmission according to attribute information of the target period.

The determining, in the predetermined configuration, the target period associated with the time domain position of the first TO includes: determining, according to the time domain position of the first TO, a period in the predetermined configuration that overlaps in a time domain with the time domain position of the first TO as the target period.

The determining, in the predetermined configuration, the target period associated with the time domain position of the first TO includes: selecting a first period in the predetermined configuration; and determining the first period as the target period, in a case that an offset between the time domain position of the first TO in the first configuration and a time domain position of a first TO in the first period is less than a time domain length of the first period.

The determining the HARQ ID of the uplink transmission according to attribute information of the target period includes: acquiring a sequence number, of a first orthogonal frequency division multiplexing (OFDM) symbol of the first TO in the target period, in system frames, the quantity of OFDM symbols in the target period, and the total quantity of HARQ processes: and determining the HARQ ID according to the sequence number, the quantity of OFDM symbols and the total quantity of HARQ processes.

The method further includes: receiving indication information transmitted by a network side device, where the indication information includes information about the predetermined configuration.

In a third aspect, embodiments of the present disclosure provide an information determination apparatus, including: a detection module, configured to: for multiple configurations of uplink grant-free transmission, detect uplink transmission on a resource corresponding to at least one of the multiple configurations: and a determination module, configured to, in a case that a first configuration corresponding to a resource where the uplink transmission is detected is not a predetermined configuration, determine a hybrid automatic repeat request (HARQ) identification (ID) of the detected uplink transmission, according to association information between the first configuration and the predetermined configuration.

The determination module includes: a first determination submodule, configured to determine a time domain position of a first transmission opportunity (TO) in the first configuration; a second determination submodule, configured to determine, in the predetermined configuration, a target period associated with the time domain position of the first TO; and a third determination submodule, configured to determine the HARQ ID of the detected uplink transmission according to attribute information of the target period.

The second determination submodule is configured to: determine, according to the time domain position of the first TO, a period in the predetermined configuration that overlaps in a time domain with the time domain position of the first TO as the target period.

The second determination submodule includes: a selection unit, configured to select a first period in the predetermined configuration: and a determination unit, configured to determine the first period as the target period, in a case that an offset between the time domain position of the first TO in the first configuration and a time domain position of a first TO in the first period is less than a time domain length of the first period.

In a fourth aspect, embodiments of the present disclosure provide an information determination apparatus, including: a first determination module, configured to determine a first configuration corresponding to a resource of uplink transmission; and a second determination module, configured to, in a case that the first configuration is not a predetermined configuration, determine a hybrid automatic repeat request (HARQ) identification (ID) of the uplink transmission, according to association information between the first configuration and the predetermined configuration.

The second determination module includes: a first determination submodule, configured to determine a time domain position of a first transmission opportunity (TO) in the first configuration; a second determination submodule, configured to determine, in the predetermined configuration, a target period associated with the time domain position of the first TO; and a third determination submodule, configured to determine the HARQ ID of the uplink transmission according to attribute information of the target period.

The second determination submodule is configured to: determine, according to the time domain position of the first TO, a period in the predetermined configuration that overlaps in a time domain with the time domain position of the first TO as the target period.

The second determination submodule includes: a selection unit, configured to select a first period in the predetermined configuration: and a determination unit, configured to determine the first period as the target period, in a case that an offset between the time domain position of the first TO in the first configuration and a time domain position of a first TO in the first period is less than a time domain length of the first period.

In a fifth aspect, embodiments of the present disclosure provide a network side device, including a transceiver, a memory, a processor and a computer program stored in the memory and executable by the processor, where the processor is configured to read the program in the memory to implement following process: for multiple configurations of uplink grant-free transmission, detecting uplink transmission on a resource corresponding to at least one of the multiple configurations; and in a case that a first configuration corresponding to a resource where the uplink transmission is detected is not a predetermined configuration, determining a hybrid automatic repeat request (HARQ) identification (ID) of the detected uplink transmission, according to association information between the first configuration and the predetermined configuration.

The processor is configured to read the program in the memory to implement following process: determining a time domain position of a first transmission opportunity (TO) in the first configuration; determining in the predetermined configuration, a target period associated with the time domain position of the first TO; and determining the HARQ ID of the detected uplink transmission according to attribute information of the target period.

The processor is configured to read the program in the memory to implement following process: determining, according to the time domain position of the first TO, a period in the predetermined configuration that overlaps in a time domain with the time domain position of the first TO as the target period.

The processor is configured to read the program in the memory to implement following process: selecting a first period in the predetermined configuration; and determining the first period as the target period, in a case that an offset between the time domain position of the first TO in the first configuration and a time domain position of a first TO in the first period is less than a time domain length of the first period.

The processor is configured to read the computer program in the memory to implement following process: acquiring a sequence number, of a first orthogonal frequency division multiplexing (OFDM) symbol of the first TO in the target period, in system frames, the quantity of OFDM symbols in the target period, and the total quantity of HARQ processes; and determining the HARQ ID according to the sequence number, the quantity of OFDM symbols and the total quantity of HARQ processes.

The processor is further configured to read the program in the memory to implement following process: configuring the multiple configurations of uplink grant-free transmission and determining the predetermined configuration among the multiple configurations; and transmitting indication information to a terminal, where the indication information includes information about the predetermined configuration.

In a sixth aspect, embodiments of the present disclosure provide a terminal, including a transceiver, a memory, a processor and a computer program stored in the memory and executable by the processor, where the processor is configured to read the program in the memory to implement following process: determining a first configuration corresponding to a resource of uplink transmission; and in a case that the first configuration is not a predetermined configuration, determining a hybrid automatic repeat request (HARQ) identification (ID) of the uplink transmission, according to association information between the first configuration and the predetermined configuration.

The processor is configured to read the program in the memory to implement following process: determining a time domain position of a first transmission opportunity (TO) in the first configuration, determining, in the predetermined configuration, a target period associated with the time domain position of the first TO; and determining the HARQ ID of the uplink transmission according to attribute information of the target period.

The processor is configured to read the program in the memory to implement following process: determining, according to the time domain position of the first TO, a period in the predetermined configuration that overlaps in a time domain with the time domain position of the first TO as the target period.

The processor is configured to read the program in the memory to implement following process: selecting a first period in the predetermined configuration; and determining the first period as the target period in a case that an offset between the time domain position of the first TO in the first configuration and a time domain position of a first TO in the first period is less than a time domain length of the first period.

The processor is configured to read the computer program in the memory to implement following process: acquiring a sequence number, of a first orthogonal frequency division multiplexing (OFDM) symbol of the first TO in the target period, in system frames, the quantity of OFDM symbols in the target period, and the total quantity of HARQ processes: and determining the HARQ ID according to the sequence number, the quantity of OFDM symbols and the total quantity of HARQ processes.

The processor is further configured to read the program in the memory to implement following process: receiving indication information transmitted by a network side device, where the indication information includes information about the predetermined configuration.

In a seventh aspect, embodiments of the present disclosure provide a computer readable storage medium, having a computer program stored thereon, where the computer program, when executed by a processor, implements the steps of the method as described in the first aspect, or the steps of the method as described in the second aspect.

The technical solutions of the embodiments of the present disclosure have the following beneficial effects.

In the embodiments of the present disclosure, for multiple configurations of uplink grant-free transmission, if uplink transmission is detected, in a case that a first configuration corresponding to a resource of the uplink transmission is not a predetermined configuration, the HARQ ID of the uplink transmission is determined according to an association relationship between the first configuration and the predetermined configuration. As a result, by utilizing the solutions of the embodiments of the present disclosure, the impact of the maximum quantity of HARQ processes may be minimized, reducing the latency.

DETAILED DESCRIPTION

Specific implementations of the present disclosure are further described in detail hereinafter with reference to the accompanying drawings and the embodiments. The following embodiments are used to illustrate the present disclosure, and are not used to limit the scope of the present disclosure.

In an NR URLLC scheme, a gNB (a base station in 5G) configures transmission of a physical uplink shared channel (PUSCH) via signaling, which includes configuring: a resource allocation period P, the quantity K of repetitions, an RV sequence, positions of K resources in a period PR or the like. The K resource positions forms K TOs.

Table 1 represents transmission schemes corresponding to different configured quantities K of repetitions and different RV configurations, for the URLLC uplink grant-free transmission scheme.

TABLE 1

|  | RV = {0 0 0 0} | RV = {0 3 0 3} | RV = {0 2 3 1} |
|---|---|---|---|
| K = 1 | {0} | {0} | {0} |
| K = 2 | {0 0} if start from $1^{st}$ TO<br>{0} if start from $2^{nd}$ TO | {0 3}<br>always start from $1^{st}$ TO | {0 2}<br>always start from $1^{st}$ TO |
| K = 4 | {0 0 0 0} if start from $1^{st}$ TO<br>{0 0 0} if start from $2^{nd}$ TO<br>{0 0} if start from $3^{rd}$ TO<br>{0} if start from $4^{th}$ TO | {0 3 0 3} if start from $1^{st}$ TO<br>{0 3} if start from $3^{rd}$ TO | {0 2 3 1}<br>always start from $1^{st}$ TO |
| K = 8 | {0 0 0 0 0 0 0 0} if start from $1^{st}$ TO<br>{0 0 0 0 0 0 0} if start from $2^{nd}$ TO<br>{0 0 0 0 0 0} if start from $3^{rd}$ TO<br>{0 0 0 0 0} if start from $4^{th}$ TO<br>{0 0 0 0} if start from $5^{th}$ TO<br>{0 0 0} if start from $6^{th}$ TO<br>{0 0} if start from $7^{th}$ TO | {0 3 0 3 0 3 0 3} if start from $1^{st}$ TO<br>{0 3 0 3} if start from $3^{rd}$ TO<br>{0 3 0 3} if start from $5^{th}$ TO<br>{0 3} if start from $7^{th}$ TO | {0 2 3 1 0 2 3 1}<br>always start from $1^{st}$ TO |

It is configured through radio resource control (RRC) that: for example, P=4, K=4, RV={0 0 0 0}, and time domain resource position is {starting orthogonal frequency division multiplexing (OFDM) symbol, quantity of OFDM symbols}. The time domain resource position is defined as a TO, i.e., completing of a repetition. K=4 means that four repeated transmissions are to be performed, and four TOs are needed.

Figure 1:
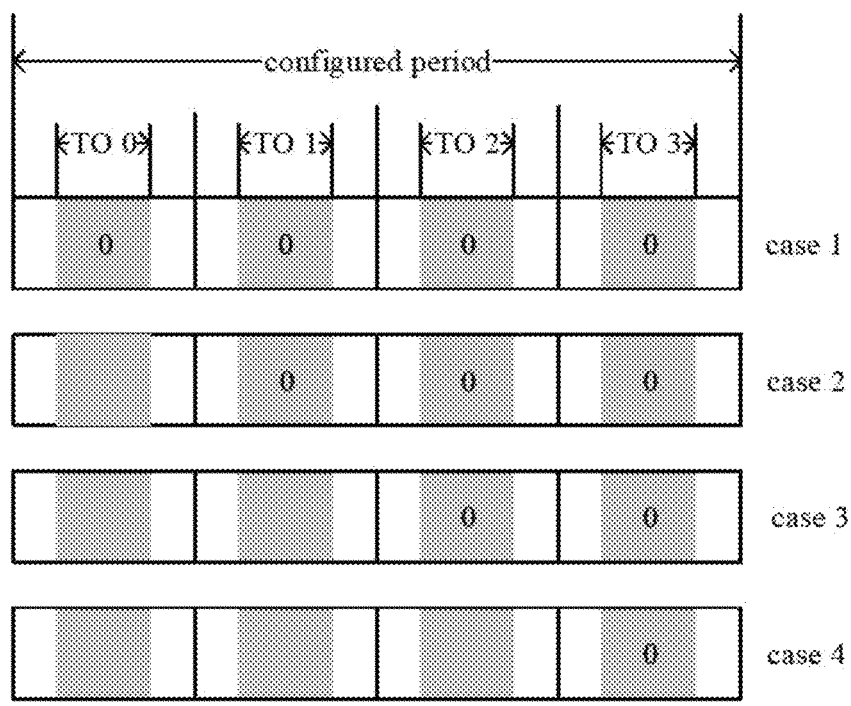
FIG. 1 is a first schematic diagram of transmission according to the related technologies.

In a case that data arrives before the first TO, the first TO may be used to start transmission, in this case, the data is transmitted four times and RV is {0 0 0 0}; in a case that data arrives after the first TO and before the second TO, the second TO may be used to start transmission, in this case, the data is transmitted three times and RV is {0 0 0}; in a case that data arrives after the second TO and before the third TO, the third TO may be used to start transmission, in this case, the data is transmitted twice and RV is {0 0}; in a case that data arrives after the third TO and before the fourth TO, the fourth TO may be used to start transmission in this case, the data is transmitted once and RV is {0}, which correspond to case 1, case 2, case 3, and case 4 in FIG. 1 respectively.

In the related technologies, a method for determining the HARQ ID is as follows: if transmission starts in the current period, the first OFDM symbol of the TO 0 of this period is determined; the sequence number of the symbol in 1024 system frames is X, the configured period includes P symbols and the total quantity of HARQ processes allowed is N, then the HARQ ID of this transmission is (floor(X/P) modulo N). As a result, in FIG. 1, no matter from which TO the transmission starts, the determined HARQ ID are the same.

In a case that multiple configurations exist simultaneously, the above method for determining the HARQ ID of the transmission may be utilized for each configuration, and in addition, an offset is added between different configurations. That is, the HARQ ID is (floor(X/P) modulo N+offset)

Figure 2:
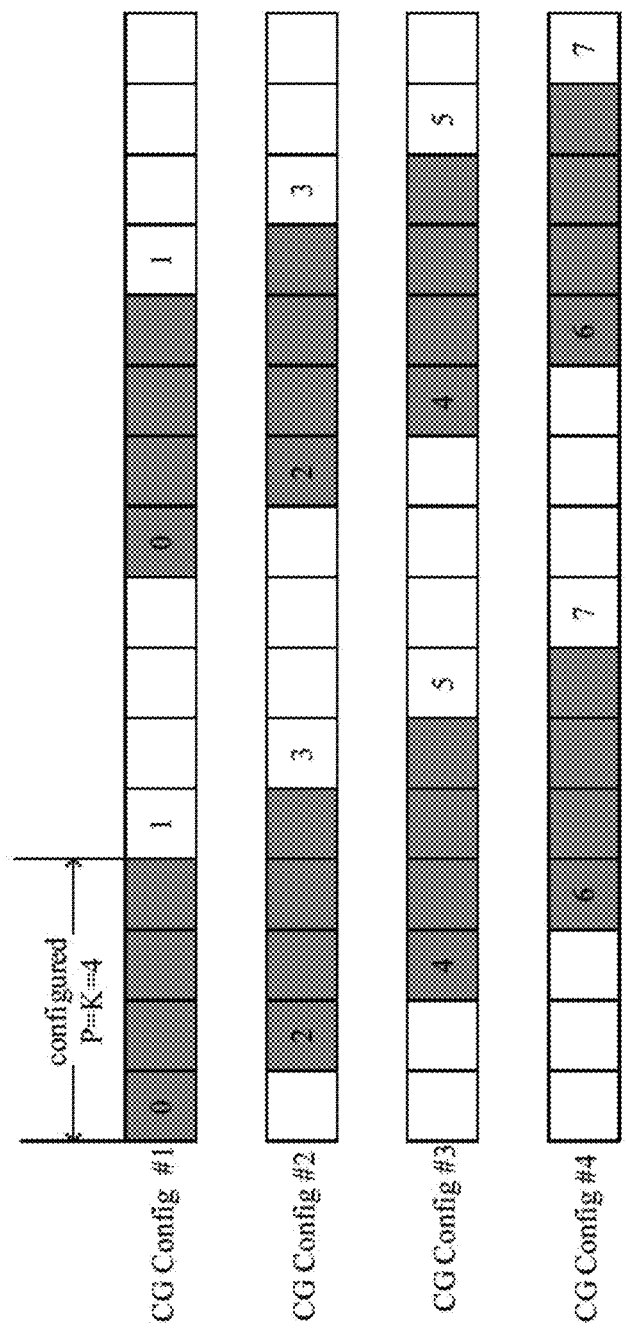
FIG. 2 is a second schematic diagram of transmission according to the related technologies.

As shown in FIG. 2, there are four configurations, and the maximum quantity of HARQ processes is 8, then each configuration is assigned with two HARQ IDs. The offsets for the configurations 1 to 4 are 0, 2, 4 and 6 respectively. In this way, the HARQ ID of the configuration 1 is 0 or 1, where the exact number is determined by the sequence number of the symbol; the HARQ ID of the configuration 2 is 2 or 3, where the exact number is determined by the sequence number of the symbol, the HARQ ID of the configuration 3 is 4 or 5, where the exact number is determined by the sequence number of the symbol; and the HARQ ID of the configuration 4 is 6 or 7, where the exact number is determined by the sequence number of the symbol.

Figure 3:
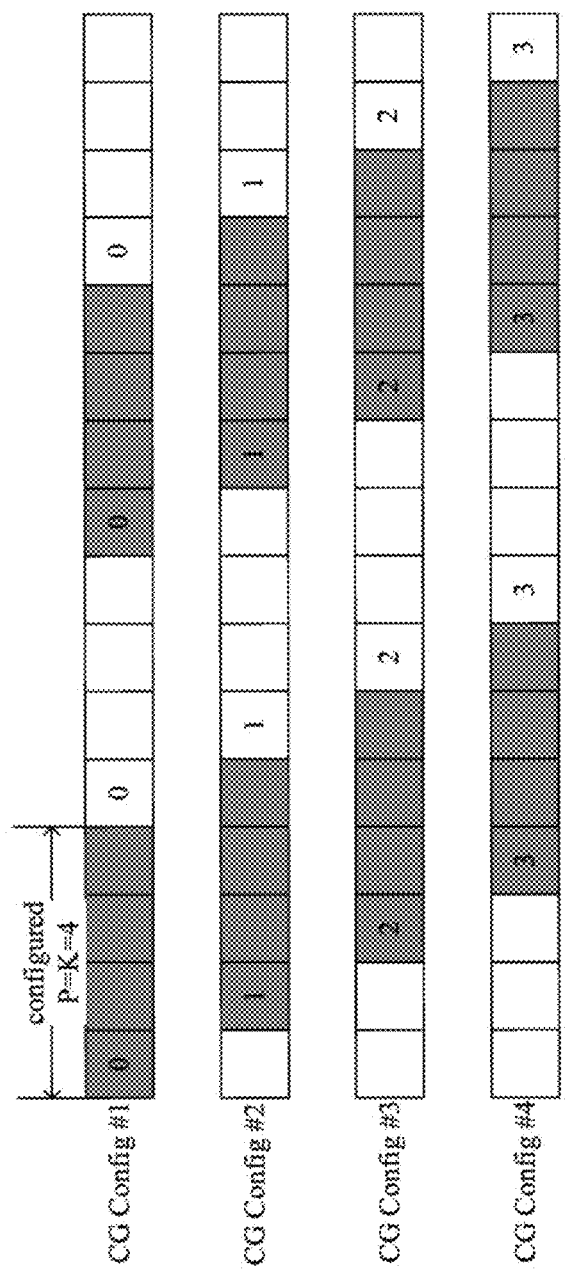
FIG. 3 is a third schematic diagram of transmission according to the relate technologies d.

The above HARQ ID determination method for multiple configurations may be affected by the maximum quantity of HARQ processes. For example, in FIG. 3, the quantity of HARQ processes is 4. In this case, each configuration has only one HARQ ID. Taking configuration 1 for example, the HARQ ID of the configuration 1 needs to be 0. After transmission of transport block (TB) within a period is completed, new TB transmission cannot follow immediately, since the new TB has to wait until the correct reception of the current TB if there is an error in the transmission of current TB, which results in a relatively large latency.

In view of the above, embodiments of the present disclosure provide a method for determining HARQ ID in a case of multiple configurations of uplink grant-free transmission, so as to reduce latency.

Figure 4:
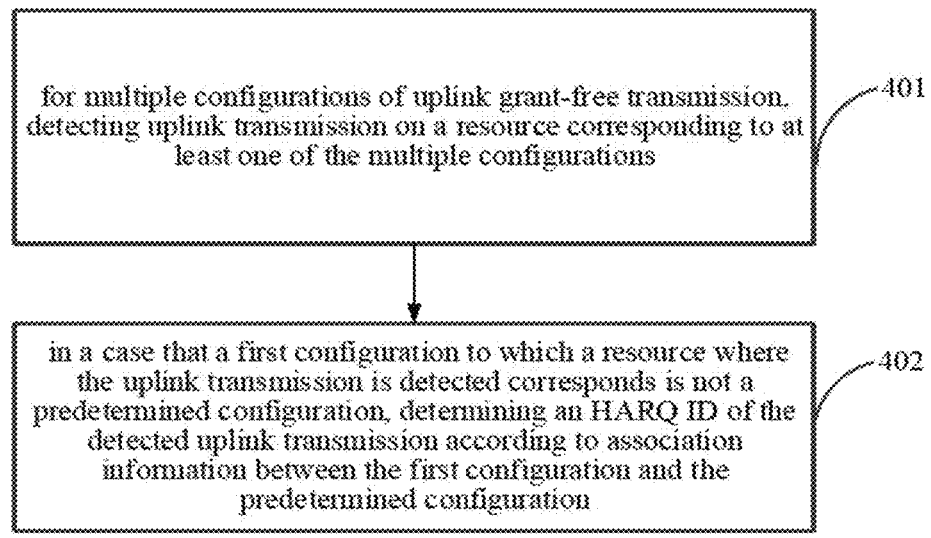
FIG. 4 is a flow diagram of an information determination method according to embodiments of the present disclosure.

As shown in FIG. 4, an information determination method according to embodiments of the present disclosure is applied to a network side device and includes the following steps.

Step 401 includes: for multiple configurations of uplink grant-free transmission, detecting uplink transmission on a resource corresponding to at least one of the multiple configurations.

Step 402 includes: in a case that a first configuration to which a resource where the uplink transmission is detected corresponds is not a predetermined configuration, determining an HARQ ID of the detected uplink transmission, according to association information between the first configuration and the predetermined configuration.

The predetermined configuration may be a configuration determined in advance or a configuration configured by a high layer.

Specifically, in this step, a time domain position of a first TO in the first configuration may be determined; and a target period associated with the time domain position of the first TO may be determined in the predetermined configuration. Then, the HARQ ID of the detected uplink transmission is determined according to attribute information of the target period.

In this step, the target period may be determined in the following manners.

A first manner includes: determining, according to the time domain position of the first TO, a period in the predetermined configuration that overlaps in a time domain with the time domain position of the first TO as the target period.

A second manner includes: selecting a first period in the predetermined configuration, and determining the first period as the target period in a case that an offset between the time domain position of the first TO in the first configuration and a time domain position of a first TO in the first period is less than a time domain length of the first period.

In determining the HARQ ID of the uplink transmission, a sequence number, of a first OFDM symbol of the first TO in the target period, in system frames, the quantity of OFDM symbols in the target period, and the total quantity of HARQ processes are acquired; then, the HARQ ID is determined according to the sequence number, the quantity of OFDM symbols and the total quantity of HARQ processes.

Specifically, according to the following formula (1), a quotient of the sequence number and the quantity of OFDM symbols is floored to obtain a first factor, then a modulo operation is performed on the first factor by using the total quantity of HARQ processes, to obtain the HARQ ID:

$$\text{HARQ ID=floor}(X/P)\text{modulo } N \quad (1)$$

X denotes the sequence number, of the first one of OFDM symbols of the first one of TOs in the target period, in system frames, P denotes the quantity of OFDM symbols in the target period, and N denotes the total quantity of HARQ processes.

If the first configuration is the predetermined configuration, the manner of determining the HARQ ID is the same as that in the related technologies. Specifically, a period where the detected uplink transmission is located is determined. The first one of OFDM symbols of the first one of TOs of this period has a sequence number of X in 1024 system frames, the period includes P symbols, and the total quantity of HARQ processes allowed is N, then the HARQ ID of the uplink transmission is: floor(X/P) modulo N.

In the embodiments of the present disclosure, when multiple configurations of uplink grant-free transmission are configured, if uplink transmission is detected, and in a case that a first configuration to which a resource of the uplink transmission corresponds is not a predetermined configuration, the HARQ ID of the uplink transmission is determined according to an association relationship between the first configuration and the predetermined configuration. Thus, by utilizing the solutions of the embodiments of the present disclosure, the impact of the maximum quantity of HARQ processes may be minimized, so as to reduce the latency.

On the basis of the above embodiments, in order to improve communication efficiency, the method may further include: the network side device configures the multiple configurations of uplink grant-free transmission and determines the predetermined configuration from the multiple configurations; and then transmits indication information to a terminal, where the indication information includes information about the predetermined configuration. The information about the predetermined configuration may include identification or the like.

The multiple configurations are differentiated from each other by different offsets. The offsets are measured with respect to the same slot boundary. The offset is in symbols and has a value which is a positive integer. It may be selected that the predetermined configuration has a minimum offset.

Figure 5:
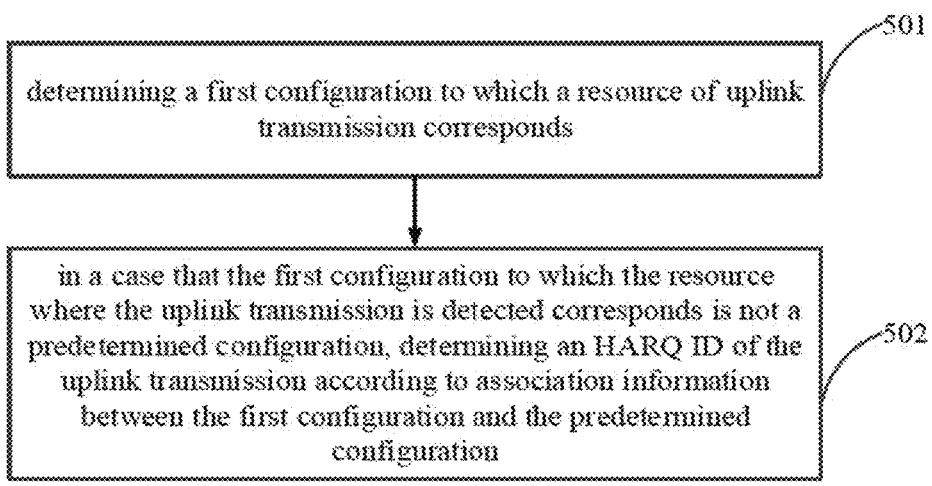
FIG. 5 is a flow diagram of an information determination method according to embodiments of the present disclosure.

As shown in FIG. 5, an information determination method according to embodiments of the present disclosure is applied to a terminal and includes the following steps.

Step 501 includes: determining a first configuration to which a resource for performing uplink transmission corresponds.

Step 502 includes: in a case that the first configuration is not a predetermined configuration, determining an HARQ ID of the uplink transmission, according to association information between the first configuration and the predetermined configuration.

The information about the predetermined configuration may be acquired from a network side device or acquired via a high layer configuration.

Specifically, in this step, a time domain position of a first TO in the first configuration may be determined; and a target period associated with the time domain position of the first TO may be determined in the predetermined configuration. Then, the HARQ ID of the uplink transmission is determined according to attribute information of the target period.

In this step, the target period may be determined in the following manners.

A first manner includes: determining, according to the time domain position of the first TO, a period in the predetermined configuration that overlaps in a time domain with the time domain position of the first TO as the target period.

A second manner includes: selecting a first period in the predetermined configuration, and determining the first period as the target period in a case that an offset between the time domain position of the first TO in the first configuration and a time domain position of a first TO in the first period is less than a time domain length of the first period.

In determining the HARQ ID of the uplink transmission, a sequence number, of a first OFDM symbol of the first TO in the target period, in system frames, the quantity of OFDM symbols in the target period, and the total quantity of HARQ processes are acquired; then, the HARQ ID is determined according to the sequence number, the quantity of OFDM symbols and the total quantity of HARQ processes.

Specifically, according to the following formula (2), a quotient of the sequence number and the quantity of OFDM symbols is floored to an integer to obtain a first factor, then a modulo operation is performed on the first factor by using the total quantity of HARQ processes, to obtain the HARQ ID:

$$\text{HARQ ID=floor}(X/P)\text{modulo } N \quad (2)$$

X denotes the sequence number of the first one of OFDM symbols of the first one of TOs in the target period in system frames, P denotes the quantity of OFDM symbols in the target period, and N denotes the total quantity of HARQ processes.

If the first configuration is the predetermined configuration, a manner of determining the HARQ ID is identical to that in the related technologies. Specifically, a period where the detected uplink transmission is located is determined. The first one of OFDM symbols of the first one of TOs of the period has a sequence number of X in 1024 system frames, the period includes P symbols, and the total quantity of HARQ processes allowed is N, then the HARQ ID of the uplink transmission is: floor(X/P) modulo N.

In the embodiments of the present disclosure, when there are multiple configurations of uplink grant-free transmission, if uplink transmission is detected, and in a case that a first configuration to which a resource of the uplink transmission corresponds is not a predetermined configuration, the HARQ ID of the uplink transmission is determined according to an association relationship between the first configuration and the predetermined configuration. Thus, by utilizing the solutions of the embodiments of the present disclosure, the impact of the maximum quantity of HARQ processes may be minimized, so as to reduce the latency.

On the basis of the above embodiments, in order to improve communication efficiency, the method may further include: receiving indication information transmitted by a network side device, where the indication information includes information of the predetermined configuration.

The information of the predetermined configuration may include identification or the like.

Figure 6:
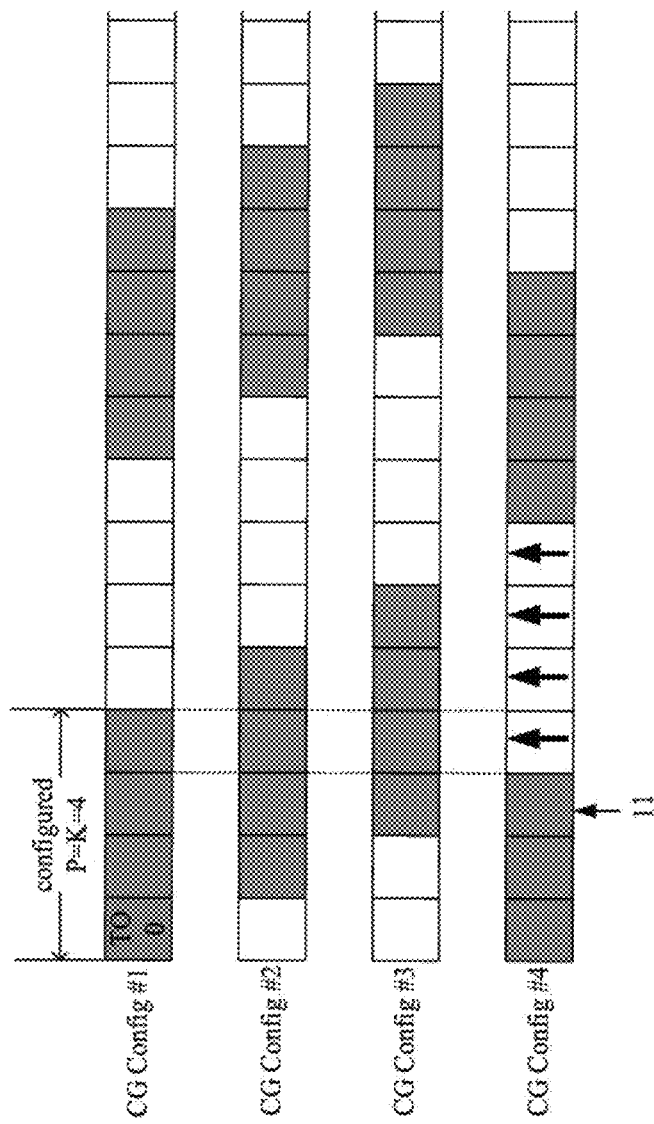
FIG. 6 is a fourth schematic diagram of transmission according to embodiments of the present disclosure.

As shown in FIG. 6, configuring is performed through RRC as follows: P=4, K=4, RV={0 0 0 0}, and time domain resource position is (starting OFDM symbol, the quantity of OFDM symbols). The time domain resource position is defined as a TO for completing a single repetition. K=4 means that four repetitions are required to meet reliability requirement, which require four TOs. It is assumed that first one of configurations (CG Config #1) is the predetermined configuration.

The moment of data arrival is new data arrival 11 in the drawing. UE may select the configuration 4 to perform repeated transmission of PUSCH and may complete four repetitions, which satisfies the reliability requirement.

The configuration used by the transmission is the configuration 4 (CG Config #4), and the first one of configurations (CG Config #1) is not used. Then, the time domain position of the first one of TOs of the configuration 4 may be determined, for example, to be between the two vertical lines in the drawing. Next, the target period, of the first one of configurations, including the above time domain position of the TO is determined, e.g., the period where the label "configured P=K=4" is located in the first one of configurations in the drawing. It is assumed that the sequence number, of the first one of OFDM symbols of the first one of TOs (TO 0) in the target period, in 1024 system frames is X, the configured period includes P symbols, and the total quantity of HARQ processes allowed is N, then the HARQ ID of the transmission is: floor(X/P) modulo N.

It can be seen from above, the embodiments of the present disclosure solves the problem of determining HARQ ID in a case that multiple configurations of uplink grant-free transmission are used and reduces the latency while ensuring reliable transmission.

Figure 7:
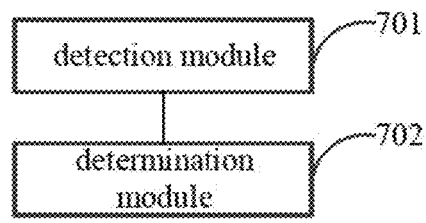
FIG. 7 is a first schematic diagram of an information determination apparatus according to embodiments of the present disclosure.

As shown in FIG. 7, an information determination apparatus according to embodiments of the present disclosure includes:

a detection module 701, configured to: for multiple configurations of uplink grant-free transmission, detect uplink transmission on a resource corresponding to at least one of the multiple configurations;

a determination module 702, configured to, in a case that a first configuration to which a resource where the uplink transmission is detected corresponds is not a predetermined configuration, determine an HARQ ID of the detected uplink transmission, according to association information between the first configuration and the predetermined configuration.

The determination module 702 includes:

a first determination submodule, configured to determine a time domain position of a first transmission opportunity (TO) in the first configuration;

a second determination submodule, configured to determine, in the predetermined configuration, a target period associated with the time domain position of the first TO: and a third determination submodule, configured to determine the HARQ ID of the detected uplink transmission according to attribute information of the target period.

The second determination submodule is specifically configured to: determine, according to the time domain position of the first TO, a period in the predetermined configuration that overlaps in a time domain with the time domain position of the first TO as the target period.

The second determination submodule includes:

a selection unit, configured to select a first period in the predetermined configuration; and a determination unit, configured to determine the first period as the target period, in a case that an offset between the time domain position of the first TO in the first configuration and a time domain position of a first TO in the first period is less than a time domain length of the first period.

The third determination submodule is specifically configured to: acquire a sequence number, of a first orthogonal frequency division multiplexing (OFDM) symbol of the first TO in the target period, in system frames, the quantity of OFDM symbols in the target period, and the total quantity of HARQ processes: and determine the HARQ ID according to the sequence number, the quantity of OFDM symbols and the total quantity of HARQ processes.

Figure 8:
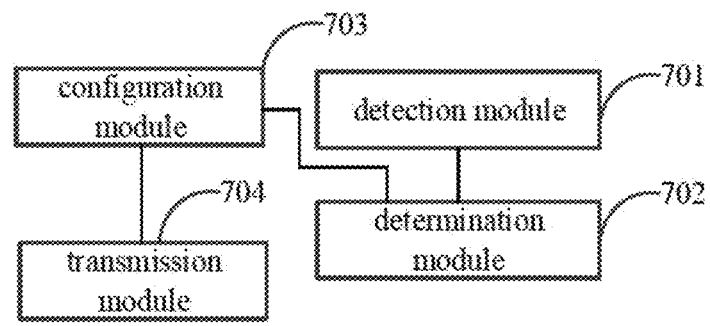
FIG. 8 is a second schematic diagram of an information determination apparatus according to embodiments of the present disclosure.

As shown in FIG. 8, the embodiments of the present disclosure may further include: a configuration module 703, configured to configure the multiple configurations of uplink grant-free transmission and determine the predetermined configuration among the multiple configurations; and a transmission module 704, configured to transmit indication information to a terminal, where the indication information includes information about the predetermined configuration.

For operating principle of the apparatus of the present disclosure, reference may be made to descriptions of the above method embodiments.

In the embodiments of the present disclosure, in a case of multiple configurations of uplink grant-free transmission, if uplink transmission is detected, and in a case that a first configuration to which a resource of the uplink transmission corresponds is not a predetermined configuration, the HARQ ID of the uplink transmission is determined according to an association relationship between the first configuration and the predetermined configuration. Thus, by utilizing the solutions of the embodiments of the present disclosure, the impact of the maximum quantity of HARQ processes may be minimized, so as to reduce the latency.

Figure 9:
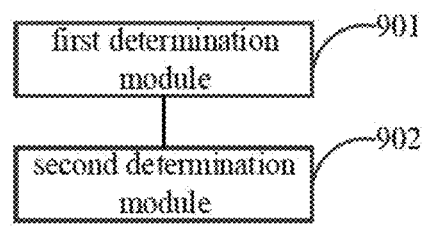
FIG. 9 is a third schematic diagram of an information determination apparatus according to embodiments of the present disclosure.

As shown in FIG. 9, an information determination apparatus according to embodiments of the present disclosure includes:

a first determination module 901, configured to determine a first configuration to which a resource of uplink transmission corresponds; and a second determination module 902, configured to, in a case that the first configuration is not a predetermined configuration, determine an HARQ ID of the uplink transmission, according to association information between the first configuration and the predetermined configuration.

The second determination module 902 includes:

a first determination submodule, configured to determine a time domain position of a first transmission opportunity (TO) in the first configuration; a second determination submodule, configured to determine, in the predetermined configuration, a target period associated with the time domain position of the first TO; and a third determination submodule, configured to determine the HARQ ID of the uplink transmission according to attribute information of the target period.

The second determination submodule is specifically configured to: determine, according to the time domain position of the first TO, a period in the predetermined configuration that overlaps in a time domain with the time domain position of the first TO as the target period.

The second determination submodule includes: a selection unit, configured to select a first period in the predetermined configuration; and a determination unit, configured to determine the first period as the target period, in a case that an offset between the time domain position of the first TO in the first configuration and a time domain position of a first TO in the first period is less than a time domain length of the first period.

The third determination submodule may include: an acquisition unit, configured to acquire a sequence number, of a first OFDM symbol of the first TO in the target period, in system frames, the quantity of OFDM symbols in the target period, and the total quantity of HARQ processes, and a determination unit, configured to determine the HARQ ID according to the sequence number, the quantity of OFDM symbols and the total quantity of HARQ processes.

Figure 10:
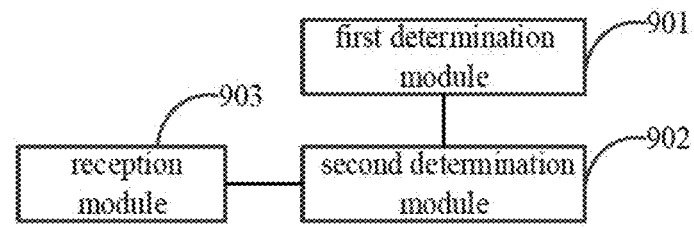
FIG. 10 is a fourth schematic diagram of an information determination apparatus according to embodiments of the present disclosure.

In order to improve communication efficiency, as shown in FIG. 10, the apparatus may further include: a reception module 903, configured to receive indication information transmitted by a network side device, where the indication information includes information about the predetermined configuration.

For the operating principle of the apparatus of the present disclosure, reference may be made to descriptions of the above method embodiments.

In the embodiments of the present disclosure, when multiple configurations of uplink grant-free transmission are adopted, if uplink transmission is detected, and in a case that a first configuration to which a resource of the uplink transmission corresponds is not a predetermined configuration, the HARQ ID of the uplink transmission is determined according to an association relationship between the first configuration and the predetermined configuration. Thus, by utilizing the solutions of the embodiments of the present disclosure, the impact of the maximum quantity of HARQ processes may be minimized, so as to reduce the latency.

Figure 11:
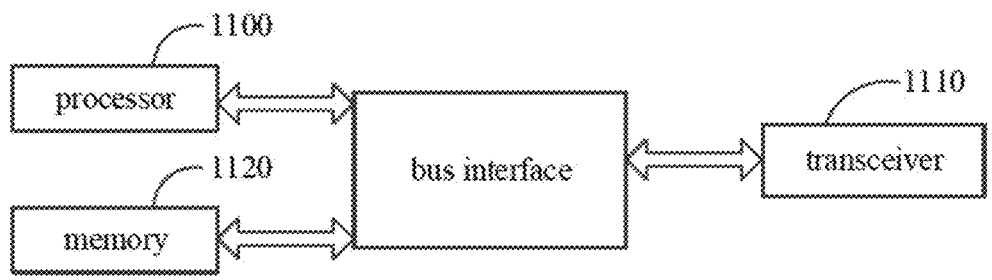
FIG. 11 is a schematic diagram of a network side device according to embodiments of the present disclosure.

As shown in FIG. 11, a network side device according to embodiments of the present disclosure includes:

a processor 1100, configured to read a computer program in a memory 1120 to implement following process: for multiple configurations of uplink grant-free transmission, detecting uplink transmission on a resource corresponding to at least one of the multiple configurations; and in a case that a first configuration to which a resource where the uplink transmission is detected corresponds is not a predetermined configuration, determining an HARQ ID of the detected uplink transmission, according to association information between the first configuration and the predetermined configuration; and a transceiver 1110, configured to receive and transmit data under the control of the processor 1100.

In FIG. 11, a bus architecture may include any quantity of interconnected buses and bridges, and various circuits of one or more processors represented by the processor 1100 and a memory represented by the memory 1120 are coupled. The bus architecture may also connect various other circuits such as peripherals, voltage regulators and power management circuits, which are well known in the art. Therefore, a further description thereof is not provided herein. A bus interface provides an interface. The transceiver 1110 may be multiple elements, that is, including a transmitter and a receiver, for providing a unit configured to communication with various other apparatuses on a transmission medium. The processor 1100 is responsible for managing the bus architecture and common processing. The memory 1120 may store data being used by the processor 1100 during operation.

The processor 1100 is responsible for managing the bus architecture and common processing. The memory 1120 may store data being used by the processor 1100 during operation.

The processor 1100 is further configured to read the computer program to implement following steps:

determining a time domain position of a first transmission opportunity (TO) in the first configuration;

determining, in the predetermined configuration, a target period associated with the time domain position of the first TO; and determining the HARQ ID of the detected uplink transmission according to attribute information of the target period.

The processor 1100 is further configured to read the computer program to implement following step: determining, according to the time domain position of the first TO, a period in the predetermined configuration that overlaps in a time domain with the time domain position of the first TO as the target period.

The processor 1100 is further configured to read the computer program to implement following steps:

selecting a first period in the predetermined configuration; and determining the first period as the target period, in a case that an offset between the time domain position of the first TO in the first configuration and a time domain position of a first TO in the first period is less than a time domain length of the first period.

The processor 1100 is further configured to read the computer program to implement following steps:

acquiring a sequence number of a first orthogonal frequency division multiplexing (OFDM) symbol of the first TO in the target period in system frames, the quantity of OFDM symbols in the target period, and the total quantity of HARQ processes; and determining the HARQ ID according to the sequence number, the quantity of OFDM symbols and the total quantity of HARQ processes.

The processor 1100 is further configured to read the computer program to implement following steps:

configuring the multiple configurations of uplink grant-free transmission and determining the predetermined configuration among the multiple configurations; and transmitting indication information to a terminal, where the indication information includes information about the predetermined configuration.

Figure 12:
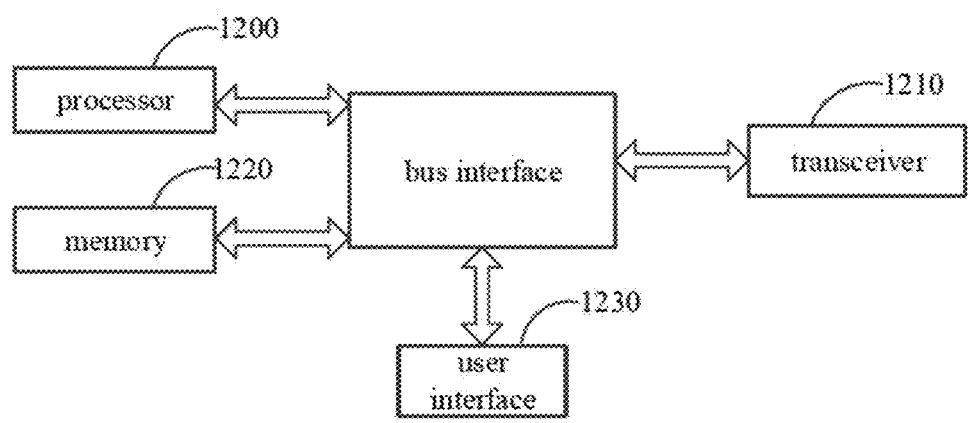
FIG. 12 is a schematic diagram of a terminal according to embodiments of the present disclosure.

As shown in FIG. 12, a terminal according to embodiments of the present disclosure includes:

a processor 1200, configured to read a computer program in a memory 1220 to implement following process: determining a first configuration to which a resource of uplink transmission corresponds; and in a case that the first configuration is not a predetermined configuration, determining an HARQ ID of the uplink transmission, according to association information between the first configuration and the predetermined configuration; and a transceiver 1210, configured to receive and transmit data under the control of the processor 1200.

In FIG. 12, a bus architecture may include any quantity of interconnected buses and bridges, and various circuits of one or more processors represented by the processor 1200 and a memory represented by the memory 1220 are coupled. The bus architecture may also connect various other circuits such as peripherals, voltage regulators and power management circuits, which are well known in the art. Therefore, a further description thereof is not provided herein. A bus interface provides an interface. The transceiver 1210 may be multiple elements, that is, including a transmitter and a receiver, for providing a unit configured to communication with various other apparatuses on a transmission medium. For different user equipments, a user interface 1230 may be an interface capable of connecting a required device externally or internally, and the connected device includes, but is not limited to: a keypad, a display, a loudspeaker, a microphone, a joystick or the like.

The processor 1200 is responsible for managing the bus architecture and common processing. The memory 1220 may store data being used by the processor 1200 during operation.

The processor 1200 is further configured to read the computer program to implement following steps:

determining a time domain position of a first transmission opportunity (TO) in the first configuration;

determining, in the predetermined configuration, a target period associated with the time domain position of the first TO; and determining the HARQ ID of the uplink transmission according to attribute information of the target period.

The processor 1200 is further configured to read the computer program to implement following step:

determining, according to the time domain position of the first TO, a period in the predetermined configuration that overlaps in a time domain with the time domain position of the first TO as the target period.

The processor 1200 is further configured to read the computer program to implement following steps:

selecting a first period in the predetermined configuration; and determining the first period as the target period, in a case that an offset between the time domain position of the first TO in the first configuration and a time domain position of a first TO in the first period is less than a time domain length of the first period.

The processor 1200 is further configured to read the computer program to implement following steps:

acquiring a sequence number of a first OFDM symbol of the first TO in the target period in system frames, the quantity of OFDM symbols in the target period, and the total quantity of HARQ processes; and determining the HARQ ID according to the sequence number, the quantity of OFDM symbols and the total quantity of HARQ processes.

The processor 1200 is further configured to read the computer program to implement following step:

receiving indication information transmitted by a network side device, where the indication information includes information about the predetermined configuration.

Further, embodiments of the present disclosure provide a computer readable storage medium storing a computer program, where the computer program may be configured to be executed by a processor, to implement following steps:

for multiple configurations of uplink grant-free transmission, detecting uplink transmission on a resource corresponding to at least one of the multiple configurations;

in a case that a first configuration to which a resource where the uplink transmission is detected corresponds is not a predetermined configuration, determining an HARQ ID of the detected uplink transmission, according to association information between the first configuration and the predetermined configuration.

The determining the HARQ ID of the detected uplink transmission according to the association information between the first configuration and the predetermined configuration includes:

determining a time domain position of a first transmission opportunity (TO) in the first configuration;

determining, in the predetermined configuration, a target period associated with the time domain position of the first TO; and determining the HARQ ID of the detected uplink transmission according to attribute information of the target period.

The determining, in the predetermined configuration, the target period associated with the time domain position of the first TO includes:

determining, according to the time domain position of the first TO, a period in the predetermined configuration that overlaps in a time domain with the time domain position of the first TO as the target period.

The determining, in the predetermined configuration, the target period associated with the time domain position of the first TO includes:

selecting a first period in the predetermined configuration, and determining the first period as the target period, in a case that an offset between the time domain position of the first TO in the first configuration and a time domain position of a first TO in the first period is less than a time domain length of the first period.

The determining the HARQ ID of the detected uplink transmission according to attribute information of the target period includes:

acquiring a sequence number of a first orthogonal frequency division multiplexing (OFDM) symbol of the first TO in the target period in system frames, the quantity of OFDM symbols in the target period, and the total quantity of HARQ processes; and determining the HARQ ID according to the sequence number, the quantity of OFDM symbols and the total quantity of HARQ processes.

Before the detecting the uplink transmission on the resource corresponding to the at least one of the multiple configurations, the steps further include:

configuring the multiple configurations of uplink grant-free transmission and determining the predetermined configuration among the multiple configurations; and transmitting indication information to a terminal, where the indication information includes information about the predetermined configuration.

Further, embodiments of the present disclosure provide a computer readable storage medium storing a computer program, where the computer program may be configured to be executed by a processor, to implement following steps:

determining a first configuration to which a resource of uplink transmission corresponds; and in a case that the first configuration is not a predetermined configuration, determining an HARQ ID of the uplink transmission, according to association information between the first configuration and the predetermined configuration.

The determining the HARQ ID of the uplink transmission according to the association information between the first configuration and the predetermined configuration includes:

determining a time domain position of a first transmission opportunity (TO) in the first configuration;

determining, in the predetermined configuration, a target period associated with the time domain position of the first TO; and determining the HARQ ID of the uplink transmission according to attribute information of the target period.

The determining, in the predetermined configuration, the target period associated with the time domain position of the first TO includes:

determining, according to the time domain position of the first TO, a period in the predetermined configuration that overlaps in a time domain with the time domain position of the first TO as the target period.

The determining, in the predetermined configuration, the target period associated with the time domain position of the first TO includes:

selecting a first period in the predetermined configuration; and determining the first period as the target period, in a case that an offset between the time domain position of the first TO in the first configuration and a time domain position of a first TO in the first period is less than a time domain length of the first period.

The determining the HARQ ID of the uplink transmission according to attribute information of the target period includes:

acquiring a sequence number of a first OFDM symbol of the first TO in the target period in system frames, the quantity of OFDM symbols in the target period, and the total quantity of HARQ processes; and determining the HARQ ID according to the sequence number, the quantity of OFDM symbols and the total quantity of HARQ processes.

The steps further include:

receiving indication information transmitted by a network side device, where the indication information includes information about the predetermined configuration.

For the embodiments according to the present disclosure, it should be understood that the disclosed device and method may be implemented in other ways. For example, the described embodiments directed to the device are merely exemplary. For example, the units are divided merely in logical function, which may be divided in another way in actual implementation, e.g., multiple units or components may be combined or integrated into another system, or some features may be ignored or not performed. In addition, the disclosed or discussed mutual coupling or direct coupling or communication connection may be implemented through some interfaces, and the indirect coupling or communication connection between devices or units may be implemented in electronic, mechanical or other forms.

In addition, functional units in various embodiments of the present disclosure may be integrated into one processing unit, or may be physically independent, or two or more units may be integrated into one unit. The integrated unit may be implemented in form of hardware, or may be implemented in form of a combination of hardware and software functional unit.

The integrated unit implemented in form of software functional unit may be stored in a computer readable storage medium. The software functional unit is stored in a storage medium, and includes several instructions for instructing a computer device (which may be a personal computer, a server, or a network device, etc.) to perform a part of the steps of the methods described in the embodiments of the present disclosure. The storage medium includes any medium that can store program code, such as a Universal Serial Bus (USB) flash drive, a mobile hard disk, a Read-Only Memory (ROM), a Random Access Memory (RAM), a magnetic disk, or an optical disc.

It can be understood that the embodiments described in the present disclosure may be implemented by hardware, software, firmware, middleware, microcode, or a combination thereof. For hardware implementation, the processing unit may be implemented in one or more application specific integrated circuits (Application Specific Integrated Circuits. ASIC), digital signal processors (Digital Signal Processing, DSP), digital signal processing devices (DSP Device, DSPD), programmable logic devices (Programmable Logic Device, PLD), field-programmable gate arrays (Field-Programmable Gate Array, FPGA), general-purpose processors, controllers, microcontrollers, microprocessors, others electronic units for performing the functions described in the present disclosure, or a combination thereof.

For software implementation, the technologies described in the embodiments of the present disclosure may be implemented by modules (such as processes, functions, etc.) that perform the functions described in the embodiments of the present disclosure. Software codes may be stored in a memory and executed by a processor. The memory may be implemented in the processor or external to the processor.

Optional embodiments of the present disclosure are described in the above. It should be noted that those skilled in the art may make various improvements and modifications without departing from the principles described in the present disclosure, and the various improvements and modifications fall within the protection scope of the present disclosure.

What is claimed is:

1. An information determination method, applied to a network side device, comprising:

for a plurality of configurations of uplink grant-free transmission, detecting uplink transmission on a resource corresponding to at least one of the plurality of configurations; and in a case that a first configuration corresponding to a resource where the uplink transmission is detected is not a predetermined configuration, determining a hybrid automatic repeat request (HARQ) identification (ID) of the detected uplink transmission, according to association information between the first configuration and the predetermined configuration;

wherein the determining the HARQ ID of the detected uplink transmission according to the association information between the first configuration and the predetermined configuration comprises:

determining a time domain position of a first transmission opportunity (TO) in the first configuration;

determining, in the predetermined configuration, a target period associated with the time domain position of the first TO; and determining the HARQ ID of the detected uplink transmission according to attribute information of the target period.

2. The information determination method according to claim 1, wherein the determining, in the predetermined configuration, the target period associated with the time domain position of the first TO comprises: determining, according to the time domain position of the first TO, a period in the predetermined configuration that overlaps in a time domain with the time domain position of the first TO as the target period.

3. The information determination method according to claim 1, wherein the determining, in the predetermined configuration, the target period associated with the time domain position of the first TO comprises:

selecting a first period in the predetermined configuration; and determining the first period as the target period, in a case that an offset between the time domain position of the first TO in the first configuration and a time domain position of a first TO in the first period is less than a time domain length of the first period.

4. The information determination method according to claim 1, wherein, before the detecting the uplink transmission on the resource corresponding to the at least one of the plurality of configurations, the method further comprises:

configuring the plurality of configurations of uplink grant-free transmission and determining the predetermined configuration among the plurality of configurations; and transmitting indication information to a terminal, wherein the indication information comprises information about the predetermined configuration.

5. An information determination method, applied to a terminal, comprising:

determining a first configuration corresponding to a resource of uplink transmission; and in a case that the first configuration is not a predetermined configuration, determining a hybrid automatic repeat request (HARQ) identification (ID) of the uplink transmission, according to association information between the first configuration and the predetermined configuration;

wherein the determining the HARQ ID of the uplink transmission according to the association information between the first configuration and the predetermined configuration comprises:

determining a time domain position of a first transmission opportunity (TO) in the first configuration;

determining, in the predetermined configuration, a target period associated with the time domain position of the first TO; and determining the HARQ ID of the uplink transmission according to attribute information of the target period.

6. The information determination method according to claim 5, wherein the determining, in the predetermined configuration, the target period associated with the time domain position of the first TO comprises: determining, according to the time domain position of the first TO, a period in the predetermined configuration that overlaps in a time domain with the time domain position of the first TO as the target period.

7. The information determination method according to claim 5, wherein the determining, in the predetermined configuration, the target period associated with the time domain position of the first TO comprises:

selecting a first period in the predetermined configuration; and determining the first period as the target period, in a case that an offset between the time domain position of the first TO in the first configuration and a time domain position of a first TO in the first period is less than a time domain length of the first period.

8. The information determination method according to claim 5, further comprising: receiving indication information transmitted by a network side device, wherein the indication information comprises information about the predetermined configuration.

9. A terminal, comprising a transceiver, a memory, a processor and a program stored in the memory and executable by the processor, wherein the processor is configured to read the program in the memory to implement the steps of the method according to claim 5.

10. The terminal according to claim 9, wherein the processor is configured to read the program in the memory to implement following process: determining, according to the time domain position of the first TO, a period in the predetermined configuration that overlaps in a time domain with the time domain position of the first TO as the target period.

11. The terminal according to claim 9, wherein the processor is configured to read the program in the memory to implement following process:

selecting a first period in the predetermined configuration; and determining the first period as the target period in a case that an offset between the time domain position of the first TO in the first configuration and a time domain position of a first TO in the first period is less than a time domain length of the first period.

12. The terminal according to claim 9, wherein the processor is further configured to read the program in the memory to implement following process: receiving indication information transmitted by a network side device, wherein the indication information comprises information about the predetermined configuration.

13. A network side device, comprising a transceiver, a memory, a processor and a program stored in the memory and executable by the processor, wherein the processor is configured to read the program in the memory to implement following process:

for a plurality of configurations of uplink grant-free transmission, detecting uplink transmission on a resource corresponding to at least one of the plurality of configurations; and in a case that a first configuration corresponding to a resource where the uplink transmission is detected is not a predetermined configuration, determining a hybrid automatic repeat request (HARQ) identification (ID) of the detected uplink transmission, according to association information between the first configuration and the predetermined configuration;

wherein the processor is configured to read the program in the memory to implement following process:

determining a time domain position of a first transmission opportunity (TO) in the first configuration;

determining, in the predetermined configuration, a target period associated with the time domain position of the first TO; and determining the HARQ ID of the detected uplink transmission according to attribute information of the target period.

14. The network side device according to claim 13, wherein the processor is configured to read the program in the memory to implement following process: determining, according to the time domain position of the first TO, a period in the predetermined configuration that overlaps in a time domain with the time domain position of the first TO as the target period.

15. The network side device according to claim 13, wherein the processor is configured to read the program in the memory to implement following process:

selecting a first period in the predetermined configuration; and determining the first period as the target period, in a case that an offset between the time domain position of the first TO in the first configuration and a time domain position of a first TO in the first period is less than a time domain length of the first period.

16. The network side device according to claim 13, wherein the processor is further configured to read the program in the memory to implement following process:

configuring the plurality of configurations of uplink grant-free transmission and determining the predetermined configuration among the plurality of configurations; and transmitting indication information to a terminal, wherein the indication information comprises information about the predetermined configuration.

* * * * *